United States Patent
Dobransky

(12) 
(10) Patent No.: US 6,262,136 B1
(45) Date of Patent: Jul. 17, 2001

(54) STORAGE STABLE FOAM-FORMING SYSTEM

(75) Inventor: Michael A. Dobransky, Pittsburgh, PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/320,016

(22) Filed: May 26, 1999

(51) Int. Cl.[7] .................................................. C08J 9/14
(52) U.S. Cl. ..................... 521/131; 521/114; 521/117; 521/155; 521/170; 521/174
(58) Field of Search ..................... 521/155, 131, 521/114, 170, 174, 117

(56) References Cited

U.S. PATENT DOCUMENTS

| | | | |
|---|---|---|---|
| 3,541,023 | 11/1970 | Cole, III | 252/359 |
| 4,972,003 | 11/1990 | Grunbauer et al. | 521/131 |
| 5,451,614 | 9/1995 | Green et al. | 521/129 |
| 5,470,891 | 11/1995 | Green et al. | 521/131 |
| 5,688,835 | * 11/1997 | Scherbel et al. | 521/131 |

* cited by examiner

Primary Examiner—John M. Cooney, Jr.
(74) Attorney, Agent, or Firm—Joseph C. Gil; Lyndanne M. Whalen; Carolyn M. Sloane

(57) ABSTRACT

An isocyanate-reactive composition containing a blowing agent that is generally a gas at ambient temperature and pressure which is storage stable is produced by including a phenol or alkylphenol having at least one phenolic hydroxyl group in the isocyanate-reactive composition in an amount sufficient to promote the solubility of the blowing agent. The isocyanate-reactive composition may be stored at ambient conditions rather than under pressure. The isocyanate-reactive composition containing blowing agent may be used to produce foams having good physical properties after storage at ambient temperature and pressure for periods as long as 3 months.

16 Claims, No Drawings

STORAGE STABLE FOAM-FORMING SYSTEM

BACKGROUND OF THE INVENTION

The present invention relates to a stable foam-forming system containing a blowing agent that is a gas at ambient temperature and pressure and to a process for the production of foams from this system.

Formulations and processes for the production of foams, particularly rigid polyurethane foams, are known. In recent years, foam producers have attempted to replace the ozone depleting CFC blowing agents with more environmentally desirable blowing agents. Among the blowing agents being evaluated and developed are hydrochloro-fluorocarbons (HCFCs) and hydrofluorocarbons (HFCs). Many of these alternative blowing agents have sufficiently low boiling points that they are in the gaseous form at ambient temperature and pressure. Consequently, it has not been possible to incorporate these blowing agents into foam-forming formulations until very shortly before use without maintaining the formulation containing the blowing agent under temperature and pressure conditions that ensure the blowing agent stays in the liquid state. See, e.g., U.S. Pat. Nos. 3,541,023; 5,451,614; and 5,470,891.

In use, the gaseous blowing agent is typically added to the day tanks of the foam machine prior to foaming. The gaseous blowing agent may also be added to the "B-side" (i.e., the isocyanate-reactive component) during blending of that reaction component or it may be added as a separate, third stream from the mixhead. Blowing agent is generally included in the "B-side" of the foam-forming mixture in an amount of from about 3 to about 5% by weight.

The need to store a formulation into which blowing agent has been incorporated under controlled temperature and pressure conditions, however, increases the expense of handling and storing such formulation. It would therefore be advantageous to develop a foam-forming formulation into which a blowing agent that is a gas at ambient conditions could be incorporated and could subsequently be stored for some period of time at ambient temperature and pressure.

U.S. Pat. No. 4,972,003 teaches that use of an isocyanate-reactive compound having an equivalent weight of greater than 140 promotes the solubility of HCFC and HFC blowing agents having boiling points below 272° K. This patent does not, however, teach that the disclosed mixtures of isocyanate-reactive compound and blowing agent are sufficiently stable that the blowing agent will remain in solution for an extended period of time. Nor does this disclosure suggest that foams can be produced from the disclosed "stable" composition by hand mixing.

It has now been found that unexpectedly high levels of a gaseous blowing agent may be incorporated into the B-side of a foam-forming composition at atmospheric pressure if a solubility-enhancing additive is included in the B-side. Blowing agents which may be successfully incorporated into the B-side include: monochloro-difluoro-methane (HCFC-22), 1-chloro-1,2,2,2-tetrafluoroethane (HCFC-124), 1,1,2,2-tetrafluoroethane (HFC-134), and 1,1,1,2-tetrafluoroethane (HFC-134a). These incorporated blowing agents do not separate from the other components present in the B-side and may be stored at ambient conditions in closed containers.

SUMMARY OF THE INVENTION

It is an object of the present invention to provide a storage-stable isocyanate-reactive composition that contains a blowing agent having at least one hydrogen atom and at least one fluorine atom (e.g., an HCFC and/or HFC blowing agent) which is normally a gas at ambient temperature and pressure (i.e., a "low boiling" blowing agent).

It is another object of the present invention to provide a storage-stable polyol/blowing agent composition that may be transported and stored at ambient temperature and pressure.

It is a further object of the present invention to provide a process for the production of rigid foams, especially rigid polyurethane foams, having good physical properties from an isocyanate-reactive composition containing a low boiling blowing agent having at least one hydrogen atom and at least one fluorine atom (hereinafter referred to as "an HFC and/or HCFC blowing agent") that has been stored at ambient temperature and pressure.

These and other objects which will be apparent to those skilled in the art are accomplished by combining (1) an isocyanate-reactive material such as a polyether polyol or a polyester polyol; (2) an HCFC and/or HFC blowing agent that has a boiling point below the ambient temperature at ambient pressure; and (3) a phenol or alkylphenol, most preferably an ethoxylated alkylphenol in which the alkyl group includes up to 18 carbon atoms. This isocyanate-reactive composition may be stored at ambient temperature and pressure for periods up to as long as 3 months before it is reacted with an isocyanate to produce a foam such as a rigid polyurethane foam.

DETAILED DESCRIPTION OF THE INVENTION

The present invention relates to storage-stable isocyanate-reactive compositions containing a blowing agent that has at least one hydrogen atom and at least one fluorine atom (i.e., an HCFC and/or HFC blowing agent) having a boiling point below ambient temperature at ambient pressure and to the use of such compositions for the production of foams.

As used herein, the term "storage stable" means that: (1) no more than 5% by weight (based on total weight of the HFC and/or HCFC initially absorbed in or incorporated into the system) of the HCFC and/or HFC blowing agent dissipates from the isocyanate-reactive material(s) over a period of 1 month, preferably for periods as long as 2 months, and in the most preferred cases, for a period of 3 months, when the composition is stored at ambient temperature and pressure (i.e., temperatures of from about 20 to about 25° C. at approximately 1 atmosphere pressure) and (2) the system into which the blowing agent has been incorporated can be used to produce a foam having good physical properties even after such storage.

Any of the isocyanate-reactive materials having a hydroxyl or amino functionality of from about 1 to about 8, preferably from about 2 to about 6.5 and an OH or NH number of from about 25 to about 1850, preferably from about 250 to about 600 known to those skilled in the art may be used in the practice of the present invention.

Suitable organic materials will generally contain two or more isocyanate reactive hydrogen atoms. Examples of suitable isocyanate reactive materials include polyols and polyamines. Polyols are particularly preferred. Examples of appropriate polyols include polyester polyols, polyether polyols, polyhydroxy polycarbonates, polyhydroxy polyacetals, polyhydroxy polyacrylates, polyhydroxy polyester amides and polyhydroxy polythioethers. Polyester polyols, polyether polyols and polyhydroxy polycarbonates are preferred.

Suitable polyester polyols include the reaction products of polyhydric alcohols (preferably dihydric alcohols to which trihydric alcohols may be added) and polybasic (preferably dibasic) carboxylic acids. In addition to these polycarboxylic acids, corresponding carboxylic acid anhydrides or polycarboxylic acid esters of lower alcohols or mixtures thereof may also be used to prepare the polyester polyols useful in the practice of the present invention. The polycarboxylic acids may be aliphatic, cycloaliphatic, aromatic and/or heterocyclic and they may be substituted, e.g. by halogen atoms, and/or unsaturated. Examples of suitable polycarboxylic acids include: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include: ethylene glycol; 1,2- and 1,3-propylene glycol; 1,3- and 1,4-butylene glycol; 1,6-hexanediol; 1,8- octanediol; neopentyl glycol; cyclohexanedimethanol; (1,4-bis (hydroxymethyl)cyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol and polybutylene glycol, glycerine and trimethylol-propane. The polyesters may also contain a portion of carboxyl end groups. Polyesters of lactones, e.g., caprolactone or hydroxyl carboxylic acids such as ω-hydroxycaproic acid, may also be used.

Suitable polycarbonates containing hydroxyl groups include those obtained by reacting diols with phosgene, a diarylcarbonate (e.g., diphenyl carbonate) or cyclic carbonates (e.g., ethylene or propylene carbonate). Examples of suitable diols include: 1,3-propanediol; 1,4-butanediol; 1,6-hexanediol; diethylene glycol; triethylene glycol; and tetraethylene glycol. Polyester carbonates obtained by reacting polyesters or polylactones (such as those described above) with phosgene, diaryl carbonates or cyclic carbonates may also be used in the practice of the present invention.

Polyether polyols which are suitable for practicing the present invention include those obtained in known manner by reacting one or more starting compounds which contain reactive hydrogen atoms with alkylene oxides such as ethylene oxide, propylene oxide, butylene oxide, styrene oxide, tetrahydrofuran, epichlorohydrin or mixtures of these alkylene oxides. Polyethers which do not contain more than about 10% by weight of ethylene oxide units are preferred. Polyethers obtained without the addition of ethylene oxide are most preferred. Suitable starting compounds containing reactive hydrogen atoms include polyhydric alcohols (described above as being suitable for preparing polyester polyols); water; methanol; ethanol; 1,2,6-hexane triol; 1,2, 4-butane triol; trimethylol ethane; pentaerythritol; mannitol; sorbitol; methyl glycoside; sucrose; phenol; isononyl phenol; resorcinol; hydroquinone; and 1,1,1- or 1,1,2-tris-(hydroxyl phenyl)-ethane.

Polyethers modified by vinyl polymers are also suitable for producing the compositions of the present invention. Such modified polyethers may be obtained, for example, by polymerizing styrene and acrylonitrile in the presence of a polyether (U.S. Pat. Nos. 3,383,351; 3,304,273; 3,523,095; 3,110,695 and German Patent No. 1,152,536).

The polythioethers useful in the practice of the present invention include the condensation products obtained from thiodiglycol on its own and/or with other glycols, dicarboxylic acids, formaldehyde, amino-carboxylic acids or amino alcohols. These condensation products may be polythio-mixed ethers, polythioether esters or polythioether ester amides, depending on the co-components.

Amine-terminated polyethers useful in preparing the compositions of the present invention may be prepared by reacting a primary amine with a polyether containing terminal leaving groups such as halides, or mesylates as disclosed in U.S. Pat. Nos. 3,666,726; 3,691,112; 5,066,824; and 5,693,864. Such amines are sold under the name Jeffamine.

Low molecular weight isocyanate reactive materials may optionally be included in the isocyanate-reactive compositions of the present invention. Appropriate low molecular weight, isocyanate-reactive compounds useful in the practice of the present invention will generally have from 1 to 3 hydroxyl groups, preferably 2 hydroxyl groups, and have an average molecular weight of from about 60 to about 200, preferably from about 100 to about 150. Useful low molecular weight isocyanate-reactive materials include the polyhydric alcohols which have previously been described as suitable for the preparation of the polyester polyols and polyether polyols. Dihydric alcohols are preferred. The weight ratio of the low molecular weight to the high molecular weight material containing two or more hydroxyl groups is generally from about 0.001 to about 2, preferably from about 0.01 to about 0.40.

In addition to the above-mentioned isocyanate-reactive compounds, monofunctional and even small amounts of trifunctional and higher functional compounds of the type generally known in polyurethane chemistry may be used to produce the compositions of the present invention. For example, trimethylolpropane may be used in cases in which slight branching is desired.

Catalysts which may be used to aid the foam-forming reaction are also often included in the isocyanate-reactive compositions of the present invention. Examples of catalysts useful for promoting urethane reactions include di-n-butyl tin dichloride, di-n-butyl tin diacetate, di-n-butyl tin dilaurate, triethylenediamine, bismuth nitrate, 1,4-diazabicyclo-[2,2,2]octane, dimethylethanolamine, dimethylcyclohexylamine and pentamethyldiethylenetriamine.

The blowing agent included in the isocyanate-reactive composition of the present invention may be any of the known HCFC and/or HFC blowing agents having a boiling point low enough that it will be a gas at ambient temperature and standard pressure, usually less than 10° C. Examples of suitable blowing agents include: dichlorofluoromethane (HCFC-22; boiling point=−40.7° C.), 1,1,2,2-tetrafluoroethane (HFC-134; boiling point=−19.6° C.), 1,1, 1,2-tetrafluoroethane (HFC-134a; boiling point=−26° C.), 1-chloro-1,2,2,2-tetrafluoroethane (HCFC 124; boiling point=−12° C.), and combinations thereof. HCFC-124, HFC-134 and HFC 134a are particularly preferred.

Other, higher boiling blowing agents (i.e., blowing agents having boiling points greater than 10° C. at ambient temperature and standard pressure) may be used in addition to the low boiling blowing agent required in the present invention. Any of the known higher boiling blowing agents such as 1,1-dichloro-1-fluoroethane (HCFC-141b; boiling point=32° C.) and, 1,1,1,3,3-pentafluoropropane (HFC-245fa; boiling point=15° C.) may be used. The higher boiling blowing agent should not, however, be used in amounts that would adversely affect the stability of the isocyanate-reactive composition.

The phenol used to promote the solubility of the low boiling blowing agent in the isocyanate-reactive material in accordance with the present invention may include alkyl and/or alkoxyl groups bound to the aromatic ring ("alkylphenol"). When the solubility promoting agent is an alkylphenol, it will generally have up to 18 carbon atoms in the alkyl group. This solubility promoting agent has at least one phenolic hydroxyl group, preferably from 1 to 3 phenolic hydroxyl groups. Particularly preferred alkylphenols are those which are ethoxylated, preferably to the extent that at least 9 ethylene oxide groups are present. Examples of specific ethoxylated alkylphenols which have been found to be suitable for promoting blowing agent solubility include: the ethoxylated nonylphenols which are commercially available under the names Igepal CO-630 (Chem Service, Inc.), Tergitol NP-9 (Union Carbide) and Surfonic N-95 (Texaco). Other phenols useful as solubility promoting agents in the practice of the present invention include: resorcinol, catechol, hydroquinone, 1,2,3-trihydroxy benzene, 1,3,5-trihydroxy benzene and 1,2,4-trihydroxy benzene.

The blowing agent is generally included in the isocyanate-reactive compositions of the present invention in an amount of from about 2 to about 25% by weight, based on the total weight of isocyanate-reactive composition, preferably from about 6 to about 25% by weight.

The solubility promoting agent is generally included in the isocyanate-reactive compositions of the present invention in an amount of from about 5 to about 30% by weight, preferably from about 10 to about 20% by weight, based on the total weight of isocyanate-reactive composition.

Optional materials included in the isocyanate-reactive compositions of the present invention such as catalysts, surfactants, etc. are generally included in amounts up to 5% by weight, preferably from about 0.1 to about 5% by weight, based on the total weight of the isocyanate-reactive composition.

Any of the known isocyanates may be used to produce polyurethane foams from the isocyanate-reactive compositions of the present invention. Specific examples of suitable isocyanates include: toluene diisocyanate ("TDI"), diphenylmethane diisocyanate ("MDI"), and polyphenyl polymethylene polyisocyanate ("Polymeric MDI") and isocyanate-terminated prepolymers of these isocyanates.

The isocyanate and isocyanate-reactive components may be reacted to form polyurethane foam by any of the known methods under the usual processing conditions. Examples of suitable methods include: hand mixing with an air driven or electric motor mixer and a conventional pour in place method in which a liquid mixture rather than a froth is dispensed.

The isocyanate and isocyanate-reactive composition are generally reacted in amounts such that the equivalent ratio of isocyanate to isocyanate-reactive groups is from about 0.9 to about 2.5, preferably from about 1.0 to about 1.5.

The storage stable isocyanate-reactive compositions of the present invention are stable at ambient temperature for periods of up to three months, generally at least two months.

Having thus described my invention, the following Examples are given as being illustrative thereof. All parts and percentages given in these Examples are parts by weight and percentages by weight, unless otherwise indicated.

EXAMPLES

The materials used in the Examples which follow were:
POLYOL A: An aromatic, amine-initiated polyether having a functionality of 4 and an OH number of from about 385–405 which is commercially available under the designation Multranol 9166 from Bayer Corporation.
POLYOL B: A sucrose-based polyether polyol having a functionality of 5.8 and an OH number of from 370 to 390 which is commercially available under the name Multranol 4030 from Bayer Corporation.
POLYOL C: A propoxylated triol based on glycerine having an OH number of from about 445–495 which is commercially available under the name Multranol 9158 from Bayer Corporation.
POLYOL D: an aromatic amine-initiated polyether polyol having an OH number of from 385–405 and a functionality of 4 which is available from Bayer Corporation under the designation Multranol 8114.
POLYOL E: A propoxylated triol based on glycerine having an OH number of approximately 470 which is commercially available under the name Multranol 9158 from Bayer Corporation.
POLYOL F: An amine-initiated polyether having an OH number of 350 and a functionality of 3.0 which is commercially available from Bayer Corporation under the name Multranol 9170.
POLYOL G: An aromatic polyester polyol having an OH number of 320 and a functionality of 2.3 which is commercially available from Hoechst Celanese.
SOL A: The ethoxylated nonylphenol which is commercially available from Chem Services, Inc. under the name Igepal CO 630.
SOL B: The ethoxylated nonylphenol which is commercially available from Union Carbide Corporation under the name Tergitol NP-9.
SOL C: The ethoxylated nonylphenol which is commercially available from Texaco under the name Surfonic N-95.
PCF: Tris(p-chloroisopropyl)phosphate, a flame retardant which is commercially available from Great Lakes Chemical under the name Fyrol PCF.
DC5357: A silicone surfactant that is commercially available from Air Products.
PV: A catalyst useful for the production of polyurethane foams which is commercially available from RheinChemie under the name Desmorapid PV.
33LV: 33% triethylene diamine in 67% dipropylene glycol which is commercially available from Air Products under the name Dabco 33-LV.
PC 8: Dimethylcyclohexylamine, commercially available from Air Products under the name Polycat 8.
HCFC 22: difluorochloromethane.
HFC 134: 1,1,2,2-tetrafluoroethane.
HFC 134a: 1,1,1,2-tetrafluoroethane.
NCO: The polymeric diphenylmethane diisocyanate having an NCO content of 31.5% by weight which is commercially available under the name Mondur MR from Bayer Corporation.

EXAMPLES

Example 1

HFC 134a was bubbled into a jar containing 100 g of SOL A at atmospheric pressure. 6.45 g of the HFC 134a were absorbed. The jar was capped, weighed and stored at room temperature for 3 months. No HFC 134a was lost during storage. The contents of the jar remained clear and no evidence of separation was seen.

Example 2

HFC 134a was bubbled into a jar containing 100 g of POLYOL D at atmospheric pressure. Only 1 g of HFC 134a were absorbed.

Example 3

HFC 134a was bubbled into a jar containing 100 g of POLYOL B at atmospheric pressure. 4.52 g of HFC 134a were absorbed. The jar was capped, weighed, and stored at room temperature 3 months. No HFC 134a was lost during storage. The contents of the jar remained clear and no evidence of separation was seen.

Example 4

HCFC-22 was bubbled into a jar containing 100 g of SOL A at atmospheric pressure. 20.07 g of HCFC-22 were absorbed. The jar was capped, weighed, and stored at room temperature for 2 months. 0.19 g of HCFC [0.09% by weight] were lost during storage.

Example 5

HCFC-22 was bubbled into a jar containing 100 g of POLYOL D at atmospheric pressure. 5.5 g of HCFC-22 were absorbed. The jar was capped, weighed, and stored at room temperature for 2 months. No HCFC-22 was lost during storage.

Example 6

HCFC-22 was bubbled into a jar containing 80 g of POLYOL D and 20 g of SOL A at atmospheric pressure. 9.75 g of HCFC-22 were absorbed. The jar was capped, weighed and stored at room temperature for 2 months. No HCFC-22 was lost during storage.

Example 7

80 g of the HCFC-22 containing polyol produced in accordance with Example 5 were blended with 1.5 g of DC 5357, 0.5 g PC-8 and 86 g of NCO and then mixed for 7 seconds and poured into a test box. The product urethane rose very little, weighed 122.66 g and had a density of 6.55 lb/ft$^3$.

Example 8

80 g of HCFC-22 containing polyol produced in accordance with Example 6 were blended with 1.5 g of DC 5357, 0.4 g of PC 8 and 86 g of NCO, mixed for 7 seconds and poured into a test box. The foam roses more than that produced in Example 7, had a density of 4.06 lb/ft$^3$ and weighed 105.65 g.

Example 9

HCFC-22 was bubbled into a jar containing 100 g of POLYOL B at atmospheric pressure. 10.67 g of HCFC-22 were absorbed. The jar was capped, weighed and stored at room temperature for 3 months. No HCFC-22 was lost. The contents of the jar were clear and showed no signs of separation.

Example 10

HCFC-22 was bubbled into a jar containing 80 g of POLYOL B and 20 g of SOL A at atmospheric pressure. 13.68 g of HCFC-22 were absorbed. The jar was capped, weighed and stored at room temperature for 1.5 months. 0.06 g of HCFC-22 [i.e., 0.04% by weight] were lost. The solution remained clear and showed no signs of separation.

Example 11

HCFC-22 was bubbled into a jar containing 100 g of POLYOL G at atmospheric pressure. 6.11 g of HCFC-22 were absorbed. The jar was capped, weighed, and stored for 2.5 months. No HCFC-22 was lost during storage. No separation of the blowing agent from the polyol was observed.

Example 12

HCFC-22 was bubbled into a jar containing 80 g of POLYOL G and 20 g of SOL A at atmospheric pressure. 8.14 g of HCFC-22 were absorbed. The jar was sealed, weighed and stored at ambient temperature and pressure for 2.5 months. No HCFC-22 was lost during storage. No separation of the blowing agent from the polyol was observed.

Example 13

HCFC-22 was bubbled into a jar containing 100 g of POLYOL F at atmospheric pressure. 14.65 g of HCFC-22 were absorbed. The jar was sealed, weighed, and stored for 3 weeks at ambient temperature and pressure. No HCFC-22 was lost during storage.

Example 14

HCFC-22 was bubbled into a jar containing 80 g of POLYOL F and 20 g of SOL A at atmospheric pressure. 20.46 g of HCFC-22 were absorbed. The jar was capped, weighed and stored at ambient temperature and pressure for 3 weeks. 0.02 g of HCFC-22 [0.09% by weight] were lost during storage.

Example 15

HFC 134a was bubbled into a vessel containing 465 g of a blend composed of 171.60 g of POLYOL D, 112.90 g of POLYOL B, 25.0 g of POLYOL C, 35 g of PCF, 100 g SOL A, 0.5 g of PV, 5.0 g of 33LV and 15.0 g of water at ambient temperature and pressure. 35.75 g of HFC134a were absorbed. The vessel was capped and stored for 2 days. No HFC 134a was lost during storage. 100 g of the polyol blend containing HFC 134a were mixed with 130 g of NCO for 7 seconds. No cell stabilization or uniformity was evident. It is therefore clear that SOL A does not function as a surfactant in a system such as that used herein.

Examples 16–19

The solubility of HFC-134 was evaluated in the systems described in Table 1. The polyols and additives listed in Table 1 were blended at 10° C. in the amounts indicated. At atmospheric pressure, HFC-134 was bubbled into the polyol blend in the amount indicated in Table 1. The blend was then weighed and stored at ambient conditions for approximately 24 hours and then re-weighed. The amount of HFC-134 lost between the first and second weighing is reported in Table 1.

TABLE 1

| EXAMPLE | 16 | 17 | 18 | 19 |
|---|---|---|---|---|
| POLYOL D (g) | 245.55 | 230.45 | 215.35 | 185.20 |
| POLYOL B (g) | 161.45 | 151.55 | 141.65 | 121.80 |
| POLYOL C (g) | 25.00 | 25.00 | 25.00 | 25.00 |
| SOL A (g) | 0 | 25.00 | 50.00 | 100.00 |
| PCF (g) | 35.00 | 35.00 | 35.00 | 35.00 |
| DC5357 (g) | 10.00 | 10.00 | 10.00 | 10.00 |
| H$_2$O (g) | 17.50 | 17.50 | 17.50 | 17.50 |
| PV (g) | 0.50 | 0.50 | 0.50 | 0.50 |
| 33LV (g) | 5.00 | 5.00 | 5.00 | 5.00 |
| HFC-134 (g bubbled in) | 45.57 | 74.18 | 80.01 | 88.56 |

TABLE 1-continued

| EXAMPLE | 16 | 17 | 18 | 19 |
|---|---|---|---|---|
| HFC-134 (g lost after 24 hrs:) | 0.61 | 0.82 | 0.42 | 0.84 |
| [%] | [1.3%] | [1.1%] | [0.5%] | [0.9%] |

Examples 20–23

The procedure used in Examples 16–19 was repeated using the materials listed in Table 2 in the amounts indicated. The amount of HFC-134 dissolved in each composition and the amount of HFC-134 lost after 24 hours of storage at ambient temperature and pressure are also reported in Table 2.

TABLE 2

| EXAMPLE | 20 | 21 | 22 | 23 |
|---|---|---|---|---|
| POLYOL D (g) | 245.55 | 230.45 | 215.35 | 185.2 |
| POLYOL B (g) | 161.45 | 151.55 | 141.65 | 121.8 |
| POLYOL C (g) | 25.00 | 25.00 | 25.00 | 25.00 |
| SOL C (g) | 0 | 25.00 | 50.00 | 100.0 |
| PCF (g) | 35.00 | 35.00 | 35.00 | 35.00 |
| DC5357 (g) | 10.00 | 10.00 | 10.00 | 10.00 |
| $H_2O$ (g) | 17.50 | 17.50 | 17.50 | 17.50 |
| PV (g) | 0.50 | 0.50 | 0.50 | 0.50 |
| 33LV (g) | 5.00 | 5.00 | 5.00 | 5.00 |
| HFC-134 (g bubbled in) | 55.05 | 64.11 | 69.93 | 89.56 |
| HFC-134 (g lost after 24 hours) | 1.73 | Not available | 0.47 | 0.80 |
| HFC-134 (% lost after 24 hours) | 3.1 | Not available | 0.6 | 0.9 |

Examples 24–27

The procedure used in Examples 16–19 was repeated using the materials listed in Table 3 in the amounts indicated. The amount of HFC-134 dissolved in each composition and the amount of HFC-134 lost after 24 hours of storage at ambient temperature and pressure are also reported in Table 3.

TABLE 3

| EXAMPLE | 24 | 25 | 26 | 27 |
|---|---|---|---|---|
| POLYOL D (g) | 245.55 | 230.45 | 215.35 | 185.2 |
| POLYOL B (g) | 161.45 | 151.55 | 141.65 | 121.8 |
| POLYOL C (g) | 25.00 | 25.00 | 25.00 | 25.00 |
| SOL B (g) | 0 | 25.00 | 50.00 | 100.0 |
| PCF (g) | 35.0 | 35.0 | 35.0 | 35.0 |
| DC 5357 (g) | 10.00 | 10.00 | 10.00 | 10.00 |
| $H_2O$ (g) | 17.50 | 17.50 | 17.50 | 17.50 |
| PV (g) | 0.50 | 0.50 | 0.50 | 0.50 |
| 33 LV (g) | 5.00 | 5.00 | 5.00 | 5.00 |
| HFC-134 (g bubbled in) | 73.97 | 77.46 | 85.01 | 95.60 |
| HFC-134 (g lost after 24 h) | 2.76 | 0.99 | 0.23 | 0.52 |
| [% HFC-134 lost after 24 h] | [3.7%] | [1.3%] | [0.3%] | [0.5%] |

Examples 28–31

The procedure used in Examples 16–19 was repeated using the materials listed in Table 4 in the amounts indicated. The amount of HCFC-22 dissolved in each composition and the amount of HCFC-22 lost after 24 hours storage at ambient temperature and pressure are also reported in Table 4. Each of the isocyanate reactive compositions was reacted with NCO in the quantity indicated in Table 4. The properties of the resultant foam are reported in Table 4.

TABLE 4

| EXAMPLE | 28 | 29 | 30 | 31 |
|---|---|---|---|---|
| POLYOL D (g) | 245.55 | 230.45 | 215.35 | 185.2 |
| POLYOL B (g) | 161.45 | 151.55 | 141.65 | 121.8 |
| POLYOL C (g) | 25.00 | 25.00 | 25.00 | 25.00 |
| PCF (g) | 35.00 | 35.00 | 35.00 | 35.00 |
| SOL B (g) | 0 | 25.00 | 50.00 | 100.00 |
| DC 5357 (g) | 10.00 | 10.00 | 10.00 | 10.00 |
| PV (g) | 0.50 | 0.50 | 0.50 | 0.50 |
| 33 LV (g) | 5.00 | 5.00 | 5.00 | 5.00 |
| $H_2O$ (g) | 17.50 | 17.50 | 17.50 | 17.50 |
| HCFC-22 (g bubbled in) | 30.00 | 35.13 | 40.98 | 44.94 |
| HCFC-22 (g lost after 24 h) | 0.37 | 0.54 | 0.76 | 0.53 |
| [% HCFC-22 lost after 24 h] | [1.2%] | [1.5%] | [1.9%] | [1.2%] |
| NCO/OH | 1.39 | 1.39 | 1.39 | — |
| Mix time (sec) | 5 | 5 | 5 | — |
| Gel time (s) | 112 | 117 | 104 | — |
| Tack Free Time (s) | 159 | 165 | 155 | — |
| Rise Time (s) | 190 | 200 | 190 | — |

Examples 32–35

The procedure used in Examples 16–19 was repeated using the materials listed in Table 5 in the amounts indicated in that Table. The amount of HCFC-22 dissolved in each composition and the amount of HCFC-22 lost after storage at ambient temperature and pressure for 24 hours are also reported in Table 5.

TABLE 5

| EXAMPLE | 32 | 33 | 34 | 35 |
|---|---|---|---|---|
| POLYOL D (g) | 245.55 | 230.45 | 215.35 | 185.20 |
| POLYOL B (g) | 161.45 | 151.55 | 141.65 | 121.80 |
| POLYOL C (g) | 25.00 | 25.00 | 25.00 | 25.00 |
| PCF (g) | 35.00 | 35.00 | 35.00 | 35.00 |
| SOL C (g) | 0 | 25.00 | 50.00 | 100.00 |
| DC 5357 (g) | 10.00 | 10.00 | 10.00 | 10.00 |
| PV (g) | 0.50 | 0.50 | 0.50 | 0.50 |
| 33 LV (g) | 5.00 | 5.00 | 5.00 | 5.00 |
| $H_2O$ (g) | 17.50 | 17.50 | 17.50 | 17.50 |
| HCFC-22 (g bubbled in) | 30.77 | 42.66 | 53.77 | 61.32 |
| HCFC-22 (g lost after 24 h) | 0.29 | 1.60 | 0.76 | 1.67 |
| [% HCFC-22 lost after 24 h] | [0.9%] | [3.75%] | [1.4%] | [2.7%] |

Examples 21–24

The procedure of Examples 16–19 was repeated using the materials listed in Table 6 in the amounts indicated in Table 6. The amount of HCFC-22 dissolved in the polyol composition and the amount of HCFC-22 lost after 48 hours storage at ambient temperature and pressure are also reported in Table 6.

TABLE 6

| EXAMPLE | 36 | 37 | 38 | 39 |
|---|---|---|---|---|
| POLYOL D (g) | 98.22 | 92.18 | 86.14 | 74.08 |
| POLYOL B (g) | 64.58 | 60.62 | 56.66 | 48.72 |
| POLYOL C (g) | 10.00 | 10.00 | 10.00 | 10.00 |
| PCF (g) | 14.00 | 14.00 | 14.00 | 14.00 |
| SOL A (g) | 0 | 10.00 | 20.00 | 40.00 |
| DC-5357 (g) | 4.00 | 4.00 | 4.00 | 4.00 |
| PV (g) | 0.20 | 0.20 | 0.20 | 0.20 |
| 33 LV (g) | 2.00 | 2.00 | 2.00 | 2.00 |
| $H_2O$ (g) | 7.0 | 7.0 | 7.0 | 7.0 |
| HCFC-22 (g bubbled in) | 16.83 | 17.07 | 21.28 | 21.85 |

TABLE 6-continued

| EXAMPLE | 36 | 37 | 38 | 39 |
|---|---|---|---|---|
| HCFC-22 (g lost)/h | 0 | 0.43/48 h | .74/48 h | .86/48 h |
| [% HCFC-22 lost] | [0%] | [2.5%] | [3.5%] | [3.9%] |

Examples 40–42

The procedure of Examples 16–19 was repeated using the materials listed in Table 7 in the amounts indicated in Table 7. The amount of HCFC-124 dissolved in the polyol composition and the amount of HCFC-124 lost after 24 hours of storage at ambient temperature and pressure are also reported in Table 7.

TABLE 7

| EXAMPLE | 40 | 41 | 42 |
|---|---|---|---|
| POLYOL D (g) | 245.55 | 215.35 | 187.70 |
| POLYOL B (g) | 161.45 | 141.65 | 123.30 |
| POLYOL C (g) | 25.00 | 25.00 | 25.00 |
| PCF (g) | 35.00 | 35.00 | 35.00 |
| SOL A (g) | 0 | 50.00 | 100.00 |
| DC-5357 (g) | 10.00 | 10.00 | 10.00 |
| PV (g) | 0.50 | 0.50 | 0.50 |
| 33 LV (g) | 5.00 | 5.00 | 5.00 |
| H$_2$O (g) | 17.50 | 17.50 | 13.50 |
| HCFC-124 (g bubbled in) | 69.06 | 104.78 | 164.25 |
| HCFC-124 (g lost after 24 hrs.) | 0.41 | 0.00 | — |
| [% HCFC-124 lost after 24 hrs.] | [0.6%] | [0%] | |

Examples 43–46

The procedure used in Examples 16–19 was repeated using the materials listed in Table 8 in the amounts indicated. The amount of HFC-134a dissolved in the polyol composition and the amount of HFC-134a lost after storage at ambient temperature and pressure for 24 hours are also reported in Table 8.

TABLE 8

| EXAMPLE | 43 | 44 | 45 | 46 |
|---|---|---|---|---|
| POLYOL D (g) | 245.55 | 230.45 | 215.35 | 185.20 |
| POLYOL B (g) | 161.45 | 151.55 | 141.65 | 121.8 |
| POLYOL C (g) | 25.00 | 25.00 | 25.00 | 25.00 |
| PCF (g) | 35.00 | 35.00 | 35.00 | 35.00 |
| SOL A (g) | 0 | 25.00 | 50.00 | 100.00 |
| DC 5357 (g) | 10.00 | 10.00 | 10.00 | 10.00 |
| PV (g) | 0.50 | 0.50 | 0.50 | 0.50 |
| 33 LV (g) | 5.00 | 5.00 | 5.00 | 5.00 |
| H$_2$O (g) | 17.50 | 17.50 | 17.50 | 17.50 |
| HFC-134a (g bubbled in) | 15.6 | 23.87 | 28.3 | 35.9 |
| HFC-134a (g lost after 24 h) | 0.78 | 1.01 | 0.65 | 0.83 |
| [% HFC-134a lost after 24 h] | [5%] | [4.2%] | [2.3%] | [2.3%] |

Examples 47–50

The procedure of Examples 16–19 was repeated using the materials listed in Table 9 in the amounts indicated in Table 9. The amount of HFC-134a dissolved in the polyol components and the amount of HFC-134a lost after storage for 24 hours at ambient temperature and pressure are also reported in Table 9.

TABLE 9

| EXAMPLE | 47 | 48 | 49 | 50 |
|---|---|---|---|---|
| POLYOL D (g) | 245.55 | 230.45 | 215.35 | 185.2 |
| POLYOL B (g) | 161.45 | 151.55 | 141.65 | 121.8 |
| POLYOL C (g) | 25.00 | 25.00 | 25.00 | 25.00 |
| PCF (g) | 35.00 | 35.00 | 35.00 | 35.00 |
| SOL B (g) | 0 | 25.00 | 50.00 | 100.0 |
| DC 5357 (g) | 10.00 | 10.00 | 10.00 | 10.00 |
| PV (g) | 0.50 | 0.50 | 0.50 | 0.50 |
| 33 LV (g) | 5.00 | 5.00 | 5.00 | 5.00 |
| H$_2$O (g) | 17.50 | 17.50 | 17.50 | 17.50 |
| HFC-134a (g bubbled in) | 18.4 | 21.89 | 28.50 | 32.12 |
| HFC-134a (g lost after 24 h) | 1.36 | 1.18 | 0.60 | 1.26 |
| [% HFC-134a lost after 24 h] | [7.4%] | [5.4%] | [2.1%] | [3.9%] |

Examples 51–54

The procedure of Examples 16–19 was repeated using the materials listed in Table 10 in the amounts indicated in Table 10. The amount of HFC-134a dissolved in the polyol composition and the amount of HFC-134a lost after storage at ambient temperature and pressure for 24 hours are also reported in Table 10.

TABLE 10

| EXAMPLE | 51 | 52 | 53 | 54 |
|---|---|---|---|---|
| POLYOL D (g) | 49.11 | 46.09 | 43.07 | 37.04 |
| POLYOL B (g) | 32.29 | 30.31 | 28.33 | 24.36 |
| POLYOL C (g) | 25.00 | 25.00 | 25.00 | 25.00 |
| PCF (g) | 35.00 | 35.00 | 35.00 | 35.00 |
| SOL C (g) | 0 | 25.00 | 50.00 | 100.00 |
| DC 5357 (g) | 10.00 | 10.00 | 10.00 | 10.00 |
| PV (g) | 0.50 | 0.50 | 0.50 | 0.50 |
| 33 LV (g) | 5.00 | 5.00 | 5.00 | 5.00 |
| H$_2$O (g) | 17.50 | 17.50 | 17.50 | 17.50 |
| HFC-134a (g bubbled in) | 15.46 | 17.55 | 22.72 | 34.59 |
| HFC-134a (g lost after 24 h) | 1.26 | 0.78 | 0.80 | 0.41 |
| [% HFC-134a lost after 24 h] | [8.2%] | [4.4%] | [3.5%] | [1.2%] |

Examples 55–56

Polyurethane foams were made by reacting the polyol compositions produced in Examples 31 and 35 with NCO in amounts such that the NCO/OH equivalent ratio was 1.3 [NCO Index=125]. The properties of the product foams are summarized in Table 11.

TABLE 11

| EXAMPLE | 55 | 56 |
|---|---|---|
| POLYOL COMPOSITION | Example 31 | Example 35 |
| Core Density (lbs./ft.$^3$) | 1.98 | 1.88 |
| % Volume change after 28 days at 70° C. and 100% relative humidity | −1.5% | 1.5% |
| % Volume change after 28 days at 100° and ambient relative humidity | −1.0% | −1.7% |
| % Volume change after 28 days at −30° C. and ambient relative humidity | 1.7% | −0.6% |
| Closed Cell Content (%) | 89.5 | 89.1 |
| Compressive Strength, parallel, 5% deflection (lbs./in.$^2$) | 36.85 | 32.22 |
| Compressive Strength, parallel, 10% deflection (lbs./in.$^2$) | 37.46 | 35.11 |
| Compressive Strength, perpendicular, 5% deflection (lbs./in.$^2$) | 18.31 | 19.11 |
| Compressive Strength, perpendicular, 10% deflection (lbs./in.$^2$) | 21.17 | 20.89 |

Examples 57–59

Polyurethane foams were made by reacting polyol compositions produced in accordance with Examples 46, 50 and 54 at an NCO Index of 125. The properties of the product foams are summarized in Table 12.

TABLE 12

| EXAMPLE | 57 | 58 | 59 |
|---|---|---|---|
| Polyol Composition | Example 46 | Example 50 | Example 54 |
| Core Density (lbs./ft.$^3$) | 1.99 | 1.97 | 1.86 |
| % Volume change after 28 days at 70° C. and 100% relative humidity | −2.4% | −5.2% | −1.4% |
| % Volume change after 28 days at 100° C. and ambient relative humidity | −1.6% | −0.4% | 0 |
| % Volume change after 28 days at −30° C. and ambient relative humidity | −2.7% | 0.5% | 0.1% |
| Closed Cell Content (%) | 85.1 | 87.5 | 87.7 |
| Compressive Strength, Parallel, 5% Deflection [lbs./in.$^2$] | 36.01 | 40.50 | 37.77 |
| Compressive Strength, Parallel, 10% Deflection [lbs./in.$^2$] | 36.68 | 37.44 | 40.33 |
| Compressive Strength, Perpendicular, 5% Deflection [lbs./in.$^2$] | 11.07 | 9.02 | 13.60 |
| Compressive Strength, Perpendicular, 10% Deflection [lbs./in.$^2$] | 13.85 | 11.33 | 17.05 |

Example 60

The following materials were blended in the amounts indicated:

| | |
|---|---|
| 32.51 parts by weight | POLYOL D |
| 21.39 parts by weight | POLYOL B |
| 5.00 parts by weight | POLYOL C |
| 20.00 parts by weight | SOL A |
| 7.00 parts by weight | PCF |
| 2.00 parts by weight | DC-5357 |
| 3.00 parts by weight | H$_2$O |
| 0.10 parts by weight | PV |
| 1.00 parts by weight | 33LV. |

To this mixture, 10 parts by weight of HCFC 22 were bubbled into this mixture. The blend was stored in a 55 gallon drum, transferred to a high pressure machine (HK-245) day tank. The resultant mixture was then reacted with NCO in amounts such that the NCO/OH Index was 1.25 using high pressure equipment. The properties of the resultant foam were as follows:

| | |
|---|---|
| Cream Time | 4 seconds |
| Gel Time | 63 seconds |
| Tack Free Time | 123 seconds |
| Free Rise Density | 1.47 lb/ft.$^3$ |
| Panel Core Density (lbs./ft.$^3$) | 2.17 |
| Closed Cell Content (%) | 88.8 |
| Initial K-factor @ 75° F. | 0.157 |
| Compressive Strength, Parallel, 10% Deflection (lbs./in.$^2$) | 33.2 |
| Compressive Strength, Perpendicular, 10% Deflection (lbs./in.$^2$) | 20.5 |

Example 61

The following materials were blended in the amounts indicated at 20° C.:

| | |
|---|---|
| 31.31 parts by weight | POLYOL D |
| 20.59 parts by weight | POLYOL B |
| 5.00 parts by weight | POLYOL C |
| 20.00 parts by weight | SOL A |
| 7.00 parts by weight | PCF |
| 2.00 parts by weight | DC 5357 |
| 0.10 parts by weight | PV |
| 3.00 parts by weight | H$_2$O. |

To this mixture, 10.0 parts by weight of HCFC 22 were combined. The resultant mixture was then reacted with NCO in an amount such that the Isocyanate Index was 1.25. The properties of the hand mixed product foam were as follows:

| | |
|---|---|
| Cream Time | 5 seconds |
| Gel Time | 83 seconds |
| Tack Free Time | 205 seconds |
| Rise Time | 190 seconds |
| Free Rise Density | 1.63 lb/ft.$^3$ |
| Panel Core Density (lbs./ft.$^3$) | 2.05 |
| Closed Cell Content (%) | 89.7 |
| Initial K-factor @ 75° F. | 0.151 |
| Compressive Strength, Parallel, 10% Deflection (lbs./in.$^2$) | 34.36 |
| Compressive Strength, Perpendicular, 10% Deflection (lbs./in.$^2$) | 21.93 |
| % Volume Change after 28 days at: | |
| 70° C./100% relative humidity | 1.9% |
| 100° C./ambient relative humidity | −0.1% |
| −30° C./ambient relative humidity | 0.5% |

Example 62

This Example is intended to demonstrate that the solution promoting additive incorporated into the compositions of the present invention does not function as a surfactant.

The following materials were blended in the amounts indicated:

| | |
|---|---|
| 32.51% by weight | POLYOL D |
| 21.39% by weight | POLYOL B |
| 5.00% by weight | POLYOL C |
| 20.00% by weight | SOL A |
| 7.00% by weight | PCF |
| 0.10% by weight | PV |
| 1.00% by weight | 33LV |
| 3.00% by weight | H$_2$O. |

To this mixture, 10.00% by weight of HCFC 22 was added. The resultant composition was then mixed with NCO in amount such the Isocyanate Index was 1.25 for 7 seconds. The product "foam" completely collapsed.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An isocyanate-reactive composition which includes a blowing agent and is storage stable at ambient temperature and pressure comprising:
   a) a polyol,
   b) an organic blowing agent which includes at least one hydrogen atom and at least one fluorine atom that is a gas at ambient pressure, and c) a phenol or alkylphenol having at least one phenolic hydroxyl group in an amount sufficient to promote the solubility of blowing agent b) in polyol a).

2. The composition of claim 1 in which polyol a) is a polyether polyol or a mixture of polyether polyols.

3. The composition of claim 1 in which blowing agent b) is HCFC-124.

4. The composition of claim 1 in which blowing agent b) is HFC-134.

5. The composition of claim 1 in which the blowing agent b) is HFC-134a.

6. The composition of claim 1 in which blowing agent b) is HCFC-22.

7. The composition of claim 1 in which the blowing agent b) is a blend or mixture of at least two blowing agents selected from the group consisting of HCFC-124, HFC-134, HFC-134a and HCFC-22.

8. The composition of claim 1 in which the phenol is an alkoxylated phenol.

9. The composition of claim 1 in which the phenol is an ethoxylated phenol.

10. The composition of claim 9 in which the ethoxylated alkylphenol is present in an amount of from about 5 to about 30 parts by weight, based on the total weight of isocyanate-reactive composition.

11. The composition of claim 1 in which the phenol is present in an amount of from about 5 to about 30 parts by weight, based on the total weight of isocyanate-reactive composition.

12. The composition of claim 1 in which a blowing agent having a boiling point greater than 10° C. is also present.

13. The composition of claim 12 in which the higher boiling blowing agent is selected from 1,1-dichloro-1-fluoroethane and/or 1,1,1,3,3-pentafluoropropane.

14. A process for the production of a rigid foam comprising reacting the isocyanate-reactive composition of claim 1 with a polyisocyanate.

15. The process of claim 12 in which the polyisocyanate is polyphenyl polymethylene polyisocyanate.

16. A process for the production of a rigid foam comprising reacting the isocyanate-reactive composition of claim 8 with a polyisocyanate.

* * * * *